United States Patent
Dang et al.

(10) Patent No.: US 7,136,847 B2
(45) Date of Patent: Nov. 14, 2006

(54) METHOD AND SYSTEM FOR DYNAMICALLY CHANGING CURSOR ATTRIBUTES IN AN EMBEDDED SQL APPLICATION

(75) Inventors: Tammie Dang, Morgan Hill, CA (US); William Robert Bireley, Morgan Hill, CA (US); Curt Lee Cotner, Gilroy, CA (US); Claire Willey McFeely, San Jose, CA (US); James Willis Pickel, Gilroy, CA (US); Koichi Yamaguchi, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 09/944,939

(22) Filed: Aug. 31, 2001

(65) Prior Publication Data
US 2003/0055821 A1   Mar. 20, 2003

(51) Int. Cl.
*G06F 17/30* (2006.01)
(52) U.S. Cl. ............................................. 707/3; 707/4
(58) Field of Classification Search ................ 707/100, 707/101, 104, 3, 4, 2, 10
See application file for complete search history.

(56) References Cited

U.S. PATENT DOCUMENTS

| | | | |
|---|---|---|---|
| 5,197,124 A | 3/1993 | Busboom et al. ........... 395/155 |
| 5,241,648 A * | 8/1993 | Cheng et al. ................... 707/7 |
| 5,257,366 A * | 10/1993 | Adair et al. .................... 707/4 |
| 5,596,748 A * | 1/1997 | Kleewein et al. ............. 707/10 |
| 5,802,523 A | 9/1998 | Jasuja et al. ................. 707/103 |
| 5,950,190 A * | 9/1999 | Yeager et al. ................... 707/3 |
| 5,960,426 A * | 9/1999 | Pirahesh et al. ............... 707/3 |
| 6,085,189 A * | 7/2000 | Pirahesh et al. ............... 707/3 |
| 6,115,703 A * | 9/2000 | Bireley et al. ................. 707/2 |
| 6,317,738 B1 * | 11/2001 | Lohman et al. ................ 707/3 |
| 6,345,244 B1 * | 2/2002 | Clark ............................ 704/7 |
| 6,466,935 B1 * | 10/2002 | Stuart ......................... 707/10 |
| 6,704,747 B1 * | 3/2004 | Fong ....................... 707/104.1 |

OTHER PUBLICATIONS

IBM Support for Multiple Like SQL Statements in REXX, IBM Technical Disclosure Bulletin, Nov. 1991, vol. 34, Issue 6, p. 314.*
Accessing and Changing Relational Data (web page)☐ ☐.*
Declare Cursor (Transact-SQL Reference (SQL Server)).*
Quass et al. On-line warehouse view maintenance, international conference on management of data, 1997, 393-404.*

* cited by examiner

*Primary Examiner*—Jean M. Corrielus
*Assistant Examiner*—Baoquoc N. To
(74) *Attorney, Agent, or Firm*—Sawyer Law Group LLP

(57) ABSTRACT

Aspects for dynamically changing attributes in an embedded-SQL application are described. In these aspects, an option is provided within a standard SQL statement for specifying one or more attributes of at least a declared cursor. The standard SQL statement is then processed to include the specified one or more attributes in at least the declared cursor. The provision occurs with an ATTRIBUTES option and within a PREPARE SQL statement.

20 Claims, 2 Drawing Sheets

METHOD AND SYSTEM FOR DYNAMICALLY CHANGING CURSOR ATTRIBUTES IN AN EMBEDDED SQL APPLICATION

FIELD OF THE INVENTION

The present invention relates to database systems, and more particularly to defining cursor attributes in database systems.

BACKGROUND OF THE INVENTION

Just as computers have become more and more prevalent in everyday life, networks of linked computers have become important in distributing information amongst computer users. Many computer systems are organized according to a client/server metaphor. Generally, in client/server computing, end users are each provided with a desktop computer or terminal known as a "client." The clients are connected using a network to another computer known as a "server", because its general function is to serve or fulfill requests submitted by clients. Application programs running on the clients prepare requests and transmit them to the server over the network. A 'network' of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network.

Of particular interest in today's computing environment are relational database applications. Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to link information from multiple tables or views together to perform complex sets of procedures with a single statement.

One particular type of operator used in SQL is a SELECT SQL statement. A SELECT SQL statement contains many options that describe a statement's updatability, isolation, and certain special optimization requests. These options are called SELECT attributes. In a 3-tier client/server architecture (application program-driver-server), an application driver program, such as an OBDC (open database connectivity) or JAVA database connectivity driver, typically issues SQLs to the database server on behalf of the C or JAVA applications in the client. Such a driver would declare several types of cursors and dynamically prepare the user's SELECT SQL using a cursor as requested with the appropriate attributes. A cursor refers to a named control structure used by an application program to point to a specific row within some ordered set of rows. The cursor is used to retrieve rows from a set.

There are many different cursor attributes. Currently, a cursor attribute (such as its scrollability, holdability, sensitivity, returnability) can be specified at the time a cursor is declared in an embedded-SQL application. By way of example, typically all cursor attributes are hard-coded either as part of the DECLARE CURSOR SQL statement or as part of a SELECT statement itself, where a SELECT statement refers to a form of query, which can be embedded in an application program. When an application would like to dynamically prepare another SELECT statement using a cursor, it uses the PREPARE SQL statement. As is well understood in the art, the PREPARE statement is used by application programs to dynamically prepare an SQL statement for execution. The PREPARE statement creates an executable SQL statement, called a prepared statement, from a character string form of the statement, called a statement string. A typical dynamic preparation process of a SELECT statement using a declared cursor is shown in FIG. 1. The process includes a step to locate the appropriate cursor in a program (step 100). The SELECT statement is then parsed and a parse tree is built to represent the SELECT statement and all the specified cursor and SELECT attributes (i.e., these are attributes specified at static declare cursor time or as part of the SELECT statement) (step 102). The catalog statistics are then looked up to determine a best access path including modification of the built parse tree (step 104). The executable form of the SELECT statement then is built (step 106).

The set of cursors declared in the driver program is finite. As more cursor and SELECT attributes are created and available on a database server, the driver program must increase the number of cursors statically declared to be able to handle a great accommodate a specific user's need. A real problem for the driver program is the permutations of all these cursor attributes. To fully support every conceivable SQL application, the driver program has to declare cursors that have all the possible permutations of SELECT cursor attributes. As the number of cursor attributes increases, the total number of cursors climbs dramatically, thus increasing storage requirements.

While allowing all cursors to be specified as part of the SELECT statement is an option, this option clutters up the SELECT statement. A further option is to define a new SQL statement to accommodate attribute changes. However, defining a new statement introduces significant overhead for processing and concerns about the lifespan of the attributes with other considerations for thread use.

Accordingly, what is needed is an approach to defining cursor attributes that provides flexibility and avoids the overhead and inefficiency of introducing a new statement. The present invention addresses such a need.

SUMMARY OF THE INVENTION

Aspects for dynamically changing attributes in an embedded-SQL application are described. In these aspects, an option is provided within a standard SQL statement for specifying one or more attributes of at least a declared cursor. The standard SQL statement is then processed to include the specified one or more attributes in at least the declared cursor. The provision occurs with an ATTRIBUTES option and within a PREPARE SQL statement.

Through the present invention, a standard approach to statement preparation is enhanced in a straightforward manner to achieve greater flexibility for dynamically changing attributes in an embedded-SQL application. With the present invention, only a small number of pre-declared cursors are needed in a driver program. When a user application needs a particular set of attributes, the driver (usually running in the middle tier) can dynamically prepare the SELECT statement and, at the same time, re-prepare these attributes with the cursor. In this manner, the cursors become reusable in the execution environment and optimizes the space required. These and other advantages of the aspects of the present invention will be more fully understood in conjunction with the following detailed description and accompanying drawings.

DETAILED DESCRIPTION

The present invention relates to defining cursor attributes in a database system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
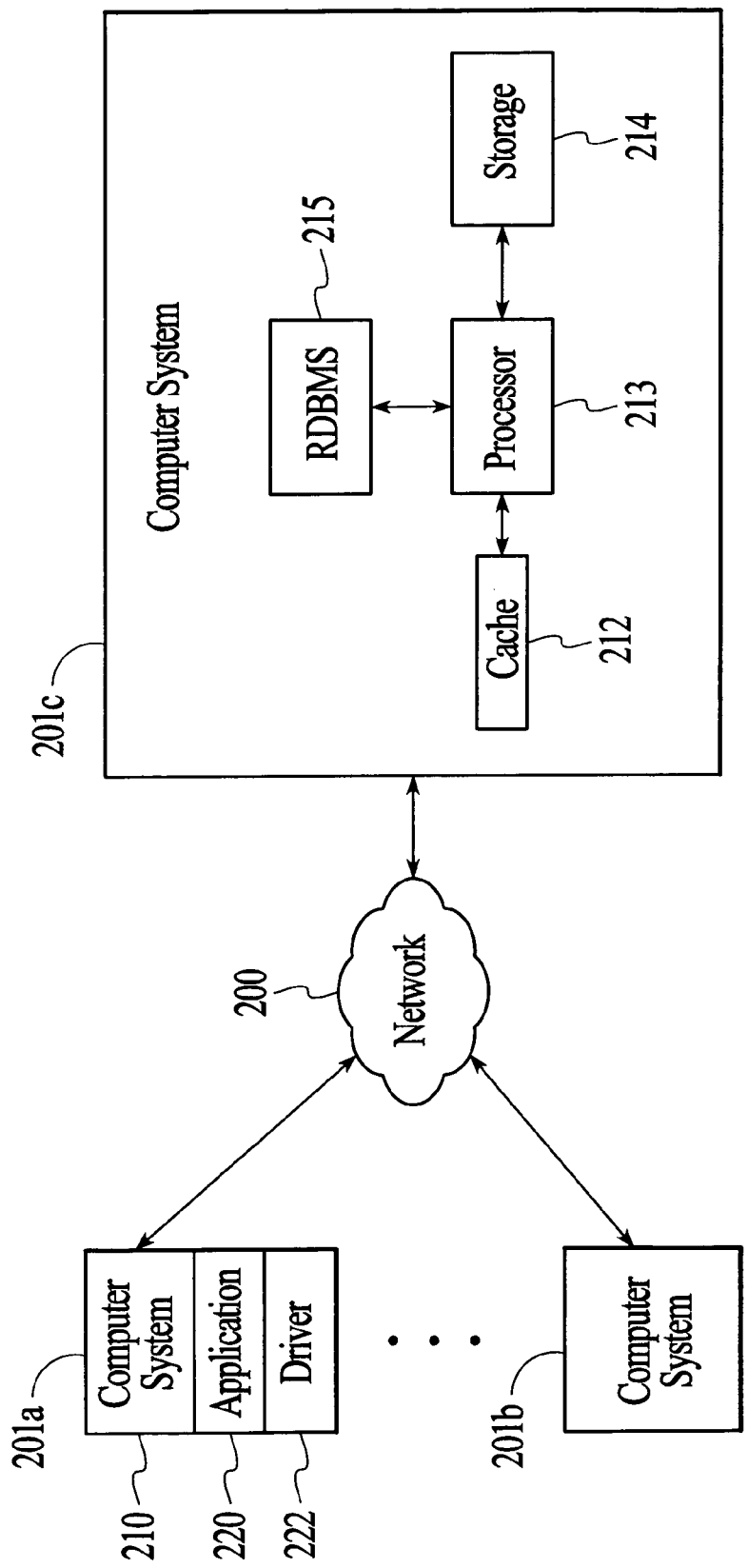
FIG. 2 illustrates a diagram representation of a database system environment in accordance with the present invention.

As shown in FIG. 2, a plurality of computer systems 201a, 201b, 201c are interconnected via a network 200 (which could be the public Internet or a private intra-corporate Intranet or wide area network). It should be appreciated that although FIG. 2 illustrates a network of computer systems, this is meant as exemplary and not restrictive of the type of environment suitable for the aspects of the present invention. One (201c) of the computer systems is shown expanded for further illustration.

Computer system 201c, capable of acting as a database server, has a processor 213 for controlling the overall operation of the computer system 201c, a high speed cache memory 212, a long-term storage device 214 (e.g., hard disk drive), and a database management system 215, e.g., an RDBMS system, such as DB2 UDB for OS/390, Version 7.0, available from International Business Machines Corporation, Armonk, N.Y. When acting as a database server to a client, such as computer system 201a, the computer system 201c forms one tier of a three-tier environment. The other two tiers are formed by an application program 220, such as a Cor JAVA application, and a driver program 222, such as OBDC, that issues SQLs to the database server on behalf of the application program 220.

Figure 1:
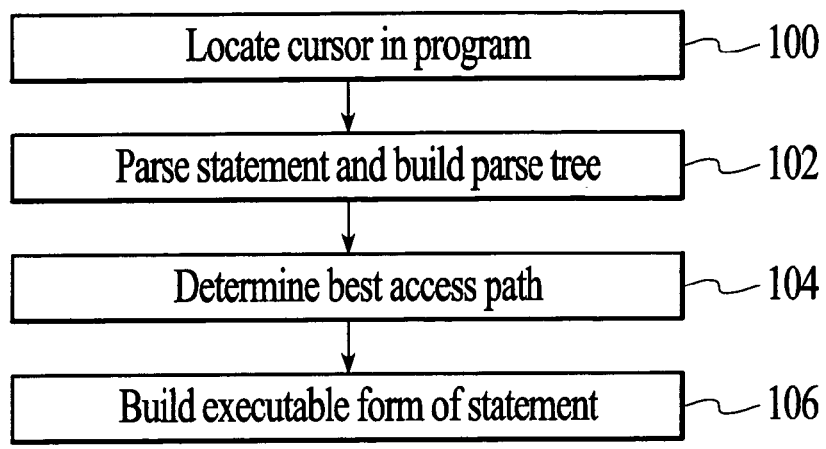
FIG. 1 illustrates a block flow diagram of a prior art dynamic preparation process of a SELECT statement using a declared cursor.
Figure 3:
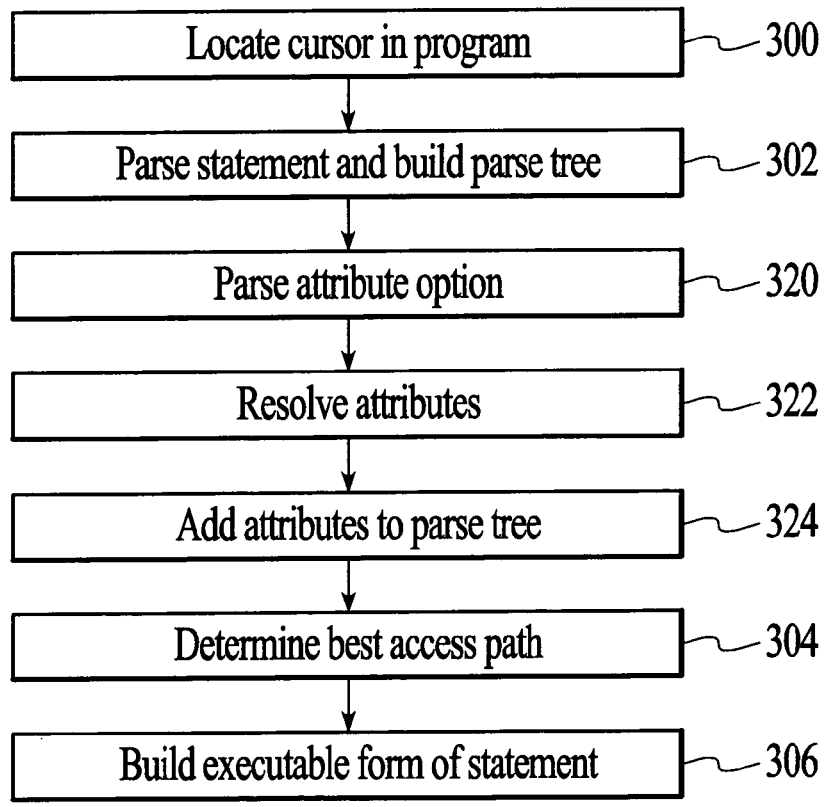
FIG. 3 illustrates a block flow diagram of a dynamic preparation process of a SELECT statement with attribute alteration in a database system in accordance with the present invention.

In accordance with the present invention, the typical process of the dynamic preparation of a SELECT statement using a declared cursor, as described with reference to FIG. 1, is augmented such that a new ATTRIBUTES option on the PREPARE SQL statement is used to specify new or changed cursor attributes during dynamic preparation of a SELECT statement using a cursor. FIG. 3 illustrates a block flow diagram of a process in accordance with the present invention for defining cursor attributes in a database server. Thus, the process begins with a step to locate the appropriate cursor in a program (step 300). The SELECT statement is then parsed and a parse tree is built to represent the SELECT statement and all the specified cursor and SELECT attributes (i.e., these are attributes specified at static declare cursor time or as part of the SELECT statement) (step 302). The new ATTRIBUTES option is then parsed (step 320). Conflicts and duplicate attributes are resolved using standard resolution techniques (step 322). The qualified attributes are inserted as new or replacement attributes in the parse tree (step 324). The catalog statistics are then looked up to determine a best access path including modification of the built parse tree (step 304). The executable form of the SELECT statement then is built (step 306). Since the new attributes are injected into the SELECT parse tree before being processed by an Optimizer of the database management system, the Optimizer would derive the appropriate access path with the requesting information, as is well appreciated by those skilled in the art.

In some systems, a cache system is used by the database server to hold the executable form of the SELECT statement in order to avoid the cost of re-preparing the same statement. Typically, these cache systems derive a hash value from the SELECT statement string and search the cache system for the hash value. If the search is not satisfied, a new entry is inserted into the cache system using the hash value, the SELECT statement, and the statement executable form after it is built. If the search is satisfied, the executable form is copied into a private area for use by the current/requested work/user.

With the method of processing new cursor and SELECT attributes at preparation time, the database server receives the attributes as a string and can concatenate this string with the SELECT statement itself. The hash value is then derived from the concatenated string and used to search the cache. In cases where the attributes are not specified separately on a particular prepare request, the concatenation can be done with an empty string. When a search is hit from the cache, the saved attributes and SELECT statement might be needed and re-referenced so the concatenated format can be used to help determine where each string starts and ends. For example, the concatenated string can be in the format: Total length+SELECT statement length+SELECT statement string+attribute length+attribute string.

With the present invention, a method for defining cursor attributes is provided that does not require a new SQL statement, as shown by the following SQL examples.

Without the ATTRIBUTES syntax:

```
/* Declare a cursor, no hold, scrollable */
EXEC SQL DECLARE mycursor SENSITIVE STATIC SCROLL CURSOR FOR mystmt;
&colon.stmtxt = 'SELECT WORKDEPT, EMPNO, SALARY, BONUS, COMM
    FROM EMP
    WHERE WORKDEPT IN ('D11', 'D21')
    FOR UPDATE OF SALARY, BONUS, COMM'
/* Prepare a SELECT using the cursor */
EXEC SQL PREPARE mystmt FROM &colon.stmtxt;
EXEC SQL DESCRIBE mystmt INTO &colon.mysqlda;
EXEC SQL OPEN mycursor;
EXEC SQL FETCH FROM mycursor USING DESCRIPTOR &colon.mysqlda;
/* Declare another cursor, with hold, non scrollable */
EXEC SQL DECLARE mycursor2 CURSOR WITH HOLD FOR mystmt2;
/* Prepare another SELECT with the non-scrollable cursor, changing it
to with hold */
&colon.stmtxt = 'SELECT MAKE, MODEL, YEAR, COLOR
    FROM AUTOMOBILE
    WHERE MAKE = 'CHEVROLET')
    FOR UPDATE OF COLOR
&colon.attrvar = 'WITH HOLD'
EXEC SQL PREPARE mystmt2 FROM &colon.stmtxt;
EXEC SQL DESCRIBE mystmt2 INTO &colon.mysqlda;
EXEC SQL OPEN mycursor2;
EXEC SQL FETCH FROM mycursor2 USING DESCRIPTOR &colon.mysqlda;
With the ATTRIBUTES syntax:
/* Declare 1 cursor, no hold, non scrollable */
EXEC SQL DECLARE mycursor CURSOR FOR mystmt;
&colon.stmtxt = 'SELECT WORKDEPT, EMPNO, SALARY, BONUS, COMM
    FROM EMP
    WHERE WORKDEPT IN ('D11', 'D21')
&colon.attrvar = 'SENSITIVE STATIC SCROLL FOR UPDATE'
/* Prepare a SELECT changing the cursor to scrollable, updatable */
EXEC SQL PREPARE mystmt ATTRIBUTES &colon.attrvar
    FROM &colon.stmtxt;
EXEC SQL DESCRIBE mystmt INTO &colon.mysqlda;
EXEC SQL OPEN mycursor;
EXEC SQL FETCH FROM mycursor USING DESCRIPTOR &colon.mysqlda ;
/* Prepare another SELECT with the non-scrollable cursor, changing it
to with hold */
&colon.stmtxt = 'SELECT MAKE, MODEL, YEAR, COLOR
    FROM AUTOMOBILE
    WHERE MAKE = 'CHEVROLET')
    FOR UPDATE OF COLOR
    FOR UPDATE OF COLOR
&colon.attrvar = 'WITH HOLD'
EXEC SQL PREPARE mystmt ATTRIBUTES &colon.attrvar
    FROM &colon.stmtxt;
EXEC SQL DESCRIBE mystmt INTO &colon.mysqlda;
EXEC SQL OPEN mycursor;
EXEC SQL FETCH FROM mycursor USING DESCRIPTOR &colon.mysqlda.
```

As demonstrated by these examples, through the aspects of the present invention, processing of new or changed cursor and SELECT attribute(s) is combined with the dynamic preparation of the SELECT statement. In this manner, even a previously declared cursor that was read only can now be used for an updatable statement or a cursor declared non-scrollable can be scrollable until the next usage. Thus, cursor reusability is achieved while improving flexibility in defining cursors in embedded-SQL applications.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for dynamically changing attributes in an embedded-SQL application, the method comprising the steps of:
    (a) providing an option within a standard SQL statement for specifying one or more new attributes for at least one declared cursor;
    (b) processing the standard SQL statement to add or replace one or more pre-defined attributes of the at least one declared cursor with the specified one or more new attributes to dynamically transform the at least one declared cursor; and
    (c) creating an executable form of the standard SQL statement using the dynamically transformed at least one declared cursor.

2. The method of claim 1, wherein the option providing step (a) further comprises the steps of (a1) providing an ATTRIBUTES option.

3. The method of claim 2, wherein option providing step (a) further comprises the steps of (a2) providing an option within a PREPARE SQL statement.

4. The method of claim 3, wherein the processing step (b) further comprises the steps of (b1) parsing the ATTRIBUTES option.

5. The method of claim 4, further comprising the step of (d) resolving one or more conflicting or duplicate attributes.

6. The method of claim 5, further comprising the step of (e) placing the one or more resolved attributes in a parse tree.

7. The method of claim 1, further comprising the step of (d) utilizing the specified one or more new attributes in a concatenated string for a dynamic cache system of a database server.

8. A system for dynamically changing attributes in an embedded-SQL application, the system comprising:
   at least one computer processing device; and
   a database management system installed on the at least one computer processing device, the database management system supporting provision of an option within a standard SQL statement for specifying one or more new attributes for at least one declared cursor, processing of the standard SQL statement to add or replace one or more pre-defined attributes of the at least one declared cursor with the specified one or more new attributes to dynamically transform the at least one declared cursor, and creation of an executable form of the standard SQL statement using the dynamically transformed at least one declared cursor.

9. The system of claim 8, wherein provision of an option further comprises provision of an ATTRIBUTES option.

10. The system of claim 9, wherein provision of an option further comprises provision of an option within a PREPARE SQL statement.

11. The system of claim 10, wherein processing further comprises parsing the ATTRIBUTES option.

12. The system of claim 11, wherein the database management system further supports resolution of one or more conflicting or duplicate attributes.

13. The system of claim 12, wherein the database management system further supports placement of the one or more resolved attributes in a parse tree.

14. The system of claim 8, wherein the database management system further supports utilization of the specified one or more new attributes in a concatenated string for a dynamic cache system of a database server.

15. A computer readable medium containing a computer program tangibly stored thereon for dynamically changing attributes in an embedded-SQL application, the computer program comprising instructions for:
   providing an option within a standard SQL statement for specifying one or more new attributes for at least one declared cursor;
   processing the standard SQL statement to add or replace one or more pre-defined attributes of the at least one declared cursor with the specified one or more new attributes to dynamically transform the at least one declared cursor; and
   creating an executable form of the standard SQL statement using the dynamically transformed at least one declared cursor.

16. The computer readable medium of claim 15, wherein providing an option further comprises providing an ATTRIBUTES option.

17. The computer readable medium of claim 16, wherein providing an option further comprises providing an option within a PREPARE SQL statement.

18. The computer readable medium of claim 17, wherein processing further comprises parsing the ATTRIBUTES option.

19. The computer readable medium of claim 18, wherein the computer program further comprises instructions for resolving one or more conflicting or duplicate attributes.

20. The computer readable medium of claim 19, wherein the computer program further comprises instructions for placing the one or more resolved attributes in a parse tree.

* * * * *